United States Patent [19]

Lemarquand et al.

[11] Patent Number: 5,106,273
[45] Date of Patent: Apr. 21, 1992

[54] VACUUM PUMP FOR PRODUCING A CLEAN MOLECULAR VACUUM

[75] Inventors: Guy Lemarquand, Villaz; Denis Perrillat-Amede, Annecy le Vieux; Didier Pierrejean, Sevrier, all of France

[73] Assignee: Alcatel Cit, Paris, France

[21] Appl. No.: 664,739

[22] Filed: Mar. 5, 1991

[30] Foreign Application Priority Data

Mar. 7, 1990 [FR] France ................... 90 02866

[51] Int. Cl.⁵ .................... F04B 17/00; F04B 35/04
[52] U.S. Cl. .................... 417/354; 417/423.4; 417/423.7; 417/423.12; 310/90.5
[58] Field of Search ............. 417/354, 423.4, 423.7, 417/423.12; 310/90.5

[56] References Cited

U.S. PATENT DOCUMENTS

| | | | |
|---|---|---|---|
| 4,036,565 | 7/1977 | Becker | 417/423.4 |
| 4,337,981 | 7/1982 | Meinke | 310/90.5 |
| 4,500,142 | 2/1985 | Brunet | 310/90.5 |
| 4,563,046 | 1/1986 | Shimamoto | 310/90.5 |
| 4,717,315 | 1/1988 | Miki et al. | 417/423.4 |
| 4,787,829 | 11/1988 | Miyazaki et al. | 417/423.4 |
| 4,812,694 | 3/1989 | Fremery | 310/90.5 |
| 4,878,813 | 11/1989 | Miki | 417/423.4 |

FOREIGN PATENT DOCUMENTS 0071456  2/1983  European Pat. Off.
1750602  3/1971  Fed. Rep. of Germany.
2246756  5/1975  France.

Primary Examiner—Richard A. Bertsch
Assistant Examiner—Alfred Basichas
Attorney, Agent, or Firm—Sughrue, Mion, Zinn Macpeak & Seas

[57] ABSTRACT

A vacuum pump for producing a clean molecular vacuum, the vacuum pump comprising a stator (1A, 1B) and a rotor (2), the rotor being driven by a drive motor (6, 7, 8) integrated in the pump, the rotor being supported by magnetic bearings, and being bell-shaped fitting over an internal projection (3) protruding from the stator, the stator components (7, 8) of the drive motor and of the bearings (11B, 12B, 13B, 15, 16) being situated on the periphery of the internal projection (3), the rotor components (11A, 12A, 13A, 14) of the drive motor and of the bearings being situated on the internal periphery of the bell-shaped rotor (2), the vacuum pump being characterized in that a first gastight coating (29) made of non-magnetic material covers the projection (3) overlying the stator components of the motor and of the bearings, and in that similarly in the rotor a second gastight coating (30) made of non-magnetic material covers the rotor components of the drive motor and of the bearings.

4 Claims, 1 Drawing Sheet

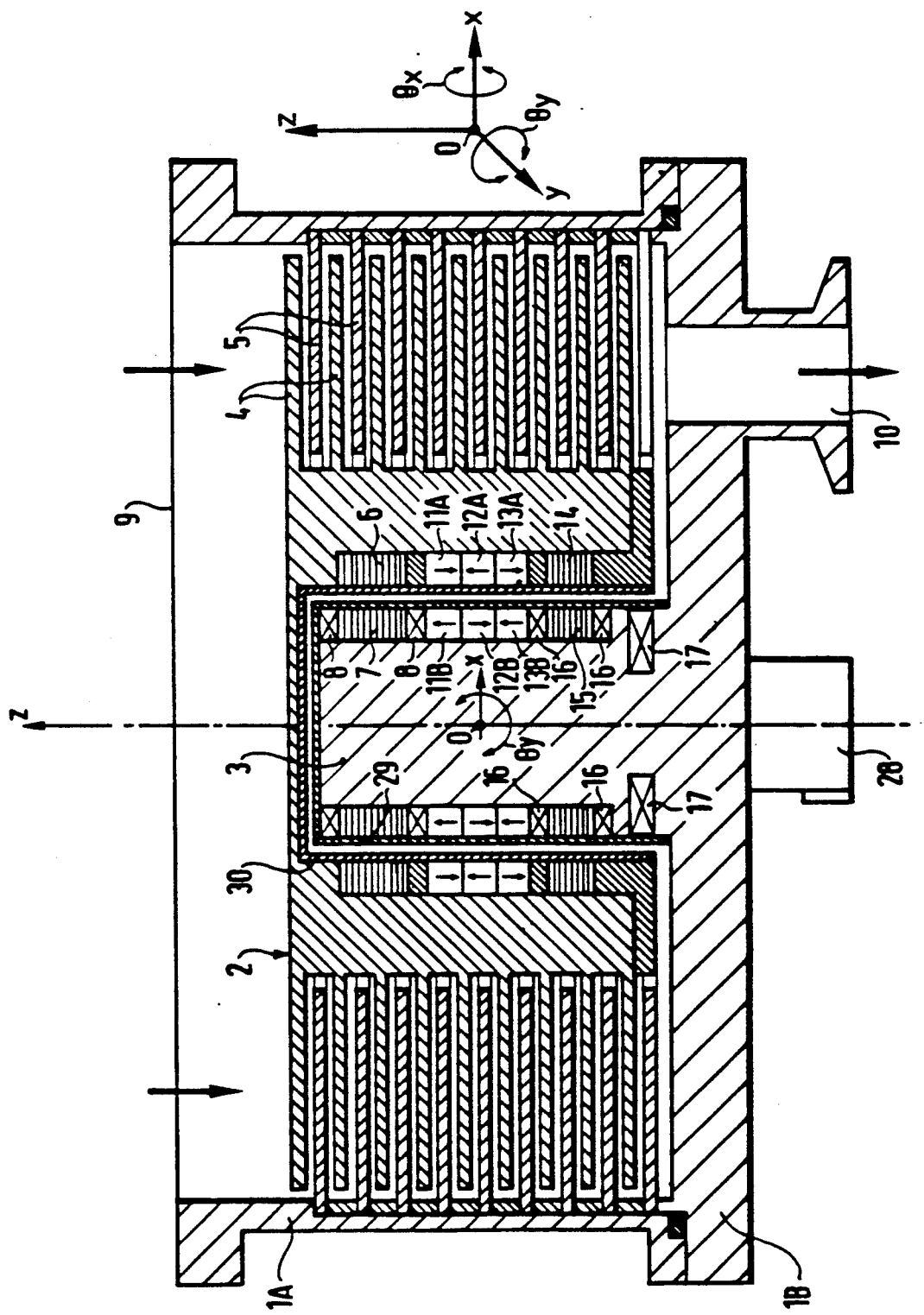

VACUUM PUMP FOR PRODUCING A CLEAN MOLECULAR VACUUM

The present invention relates to a vacuum pump for producing a clean molecular vacuum.

Magnetically supported vacuum pumps are particularly well suited to obtaining very clean vacuums, i.e. vacuums free from any oil or dust pollution caused by friction, since there are no solid bodies supporting the pump rotor.

However, the components constituting the magnetic suspension of the rotor and those constituting its rotary drive include lamination stacks, coils, sintered materials, and resins which suffer from the drawback of degassing in a vacuum. Such degassing prevents very low pressures from being obtained and pollutes the chamber to be evacuated.

A dynamic seal separates those regions of the pump which are in the vacuum from the region including the rotary drive members and the suspension members. However this dynamic seal is only efficient at high speed, and it is ineffective when stopped.

An object of the present invention is to provide a vacuum pump enabling this drawback to be mitigated.

To this end, the invention provides a vacuum pump for producing a clean molecular vacuum, said vacuum pump comprising a stator and a rotor, the rotor being driven by a drive motor integrated in the pump, the rotor being supported by magnetic bearings, and being bell-shaped fitting over an internal projection protruding from the stator, the stator components of the drive motor and of said bearings being situated on the periphery of said internal projection, the rotor components of the drive motor and of said bearings being situated on the internal periphery of said bell-shaped rotor, said vacuum pump being characterized in that a first gastight coating made of non-magnetic material covers said projection overlying said stator components of the motor and of the bearings, and in that similarly in the rotor a second gastight coating made of nonmagnetic material covers said rotor components of the drive motor and of said bearings.

An embodiment of the invention is described below with reference to the sole FIGURE of the accompanying drawing.

This FIGURE shows a furbomolecular blade pump comprising a stator in two portions 1A and 1B and a bell-shaped rotor 2 which fits over an internal projection 3 protruding from the portion 1B of the stator.

The rotor has rotor blades 4 and the stator has stator blades 5.

The rotor 2 is rotated about its axis oz by a hysteresis-type electric motor comprising a rotor 6 and an internal stator 7 with its coil 8 mounted on the projection 3 protruding from the portion 1B of the stator of the pump.

The stator includes a suction inlet 9 and a delivery outlet 10.

The rotor 2 is magnetically supported in the stator 1A-1B by means of two magnetic bearings, namely: a passive axial magnetic support, and an active radial magnetic bearing.

The axial support holds the rotor in position axially along its axis oz and also stabilizes it against rotation $\theta x$ and $\theta y$ about the axes ox and oy which are perpendicular to each other and situated in a plane perpendicular to the axis oz.

Said axial support is constituted by three pairs of permanent magnets in the form of axially magnetized rings. Each pair comprises a rotor ring and a stator ring which are magnetized in opposite directions to each other as shown by the arrows. The first pair is composed of rings 11A and 11B, the second of rings 12A and 12B, and the third of rings 13A and 13B. As shown in the figure, each pair of rings is also magnetized in the opposite direction to the adjacent pair (or both adjacent pairs, for the middle pair of rings). This disposition enables the efficiency of the bearing to be increased, because each time two pairs of rings touch via faces having the same polarity as each other, their efficiency is equivalent to that of three identical touching rings but magnetized in the same direction, or equivalent to that of a single ring of triple thickness. Thus, in this case, since there are twice two pairs of rings touching via faces having the same polarity as each other (the first pair with the second, and the second with the third), there are the equivalent of five unit pairs disposed in the same direction. Greater efficiency is thus obtained within the same volume.

In order for said axial support to have a stabilizing effect against rotation $\theta x$ about the axis ox and $\theta y$ about the axis oy, it is highly advisable (as is the case in FIG. 1) to dispose the bearing, constituted by three pairs of rings, in such a manner that its center of gravity coincides or substantially coincides with the center of gravity O of the rotor 2. Of course, the number of pairs of magnetized rings is not limited to three and there could be only one pair.

The radial magnetic bearing is active and it controls radial translation along the axes ox and oy. It comprises a rotor 14 constituted by a stack of laminations which are electrically insulated from one another and which are magnetically isolated, and a stator 15 internally mounted on the projection 3 protruding from the stator of the pump. Said stator 15 comprises eight electromagnets 16 which produce electromagnetic forces along the axes ox and oy. Four position detectors 17 enable the radial position of the rotor to be measured along said axes ox and oy.

The electromagnets 16 are servo-controlled conventionally by means of two servo-control channels as a function of data supplied by the position detectors 17.

There is one servo-control channel for the electromagnets which act along the axis ox and another for the electromagnets which act along the axis oy.

The electrical connections are provided by an electrical connector referenced 28.

The pump does not include any mechanical back-up bearings, so as to be completely free from any possibility of pollution in order to preserve a perfectly clean vacuum.

In addition, and in accordance with the invention, a first gastight coating 29 made of non-magnetic material covers the projection 3 protruding from the stator portion 1B overlying the stator components 7, 8 of the motor and the components 11B, 11C, 11D and 15, 16 of the magnetic bearings.

A second gastight coating 30 also made of non-magnetic material overlies the rotor components 6 of the drive motor and the components 11A, 11B, 11C and 14 of the magnetic bearings.

Said coatings 29 and 30 are thin coatings. For example, it is possible to use aluminum coatings cemented in a vacuum e.g. by means of an epoxy resin.

Ceramic coatings cemented in a vacuum may also be used.

These coatings may also be implemented by deposition, by evaporation in a vacuum, e.g. using nickel.

This provides excellent isolation of the portions capable of causing pollution in the chamber to be evacuated.

The invention obviously applies regardless of the types of magnetic bearings used and not only to the specific pump described above which includes an active radial bearing and a passive axial support.

We claim:

1. A vacuum pump for producing a clean molecular vacuum, said vacuum pump comprising a stator (1A, 1B) and a rotor (2), the rotor being driven by a drive motor (6, 7, 8) integrated in the pump, the rotor being supported by magnetic bearings, and being bell-shaped fitting over an internal projection (3) protruding from the stator, the stator components (7, 8) of the drive motor and of said bearings (11B, 12B, 13B, 15, 16) being situated on the periphery of said internal projection (3), the rotor components (11A, 12A, 13A, 14) of the drive motor and of said bearings being situated on the internal periphery of said bell-shaped rotor (2), said vacuum pump being characterized in that a first gastight coating (29) made of non-magnetic material covers said projection (3) overlying said stator components of the motor and of the bearings, and in that similarly in the rotor a second gastight coating (30) made of non-magnetic material covers said rotor components of the drive motor and of said bearings.

2. A vacuum pump according to claim 1, characterized in that said coatings are made of aluminum and cemented in a vacuum.

3. A vacuum pump according to claim 1, characterized in that said coatings are constituted by a deposit of nickel applied by evaporation in a vacuum.

4. A vacuum pump according to claim 1, characterized in that said coatings are made of ceramic and are cemented in a vacuum.

* * * * *